(12) United States Patent
Phillips

(10) Patent No.: US 8,469,855 B2
(45) Date of Patent: Jun. 25, 2013

(54) TWO-SPEED TRANSMISSION MODULE WITH PASSIVE AUTOMATIC SHIFTING

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 328 days.

(21) Appl. No.: 12/974,053

(22) Filed: Dec. 21, 2010

(65) Prior Publication Data

US 2012/0100953 A1 Apr. 26, 2012

Related U.S. Application Data

(60) Provisional application No. 61/406,669, filed on Oct. 26, 2010.

(51) Int. Cl.
*F16H 3/44* (2006.01)

(52) U.S. Cl.
USPC ............ 475/293; 475/297; 475/318; 475/322

(58) Field of Classification Search
USPC .................. 475/293, 296, 297, 317, 318, 320
See application file for complete search history.

(56) References Cited

U.S. PATENT DOCUMENTS

| 5,409,428 | A | 4/1995 | Antonov |
| 6,363,807 | B1* | 4/2002 | Takahashi et al. .......... 74/336 R |
| 2003/0104900 | A1* | 6/2003 | Takahashi et al. ................. 477/3 |
| 2004/0173174 | A1* | 9/2004 | Sugino et al. ............ 123/179.28 |
| 2005/0202926 | A1* | 9/2005 | Antonov et al. ............... 475/293 |
| 2006/0025278 | A1* | 2/2006 | Antonov et al. ............... 475/318 |

\* cited by examiner

*Primary Examiner* — Roger Pang
(74) *Attorney, Agent, or Firm* — Quinn Law Group, PLLC

(57) ABSTRACT

A multi-speed transmission module is provided that can passively and automatically upshift and downshift between two speed ratios, even if the speed of the output member does not decrease. The transmission module includes a planetary gear set. A torque-transmitting mechanism is engageable to connect the two members of the planetary gear set for common rotation. A centripetal member is configured to apply a first axial force urging engagement of the torque-transmitting mechanism. The first axial force increases as the speed of the output member increases. A torque-to-thrust actuator, such as a ball screw actuator, is connected for rotation with the input member and is configured to apply a second axial force opposing engagement of the torque-transmitting mechanism.

13 Claims, 2 Drawing Sheets

TWO-SPEED TRANSMISSION MODULE WITH PASSIVE AUTOMATIC SHIFTING

CROSS-REFERENCE TO RELATED APPLICATION

This application claims the benefit of U.S. Provisional Application Ser. No. 61/406,669 filed on Oct. 26, 2010, which is hereby incorporated by reference in its entirety.

TECHNICAL FIELD

The invention relates to a transmission module that shifts passively and automatically.

BACKGROUND

Delivery of tractive force to vehicle wheels must be accomplished as smoothly as possible. For example, shifting a vehicle between available speed ratios should be done without abrupt changes in torque that will be noticeable to vehicle occupants. Automatic transmissions typically rely on electronic and hydraulic controls to engage and disengage clutches and brakes to accomplish speed ratio changes. Although sufficient for their intended purpose, such controls may add complexity and cost.

Some transmissions have been proposed that use centripetal clutches with masses attached rotationally to the output member, so that as engine speed rises, so does the torque capacity of the clutch. Such transmissions are not able to passively downshift if relatively high output speed is constant, because the centripetal clutch will remain engaged.

Other transmissions have been proposed that use intermeshing helical gears of a planetary gear set that create an axial thrust when carrying torque. The axial thrust acts as a release force opposing engagement of a clutch that connects two members of the gear set to one another. However, once the clutch is engaged in such a transmission, the gear set is in a direct drive mode, not carrying torque, and thus not creating a release force. If input torque in such a transmission increases, the clutch will slip, possibly for an extended period of time, which could damage the clutch.

SUMMARY

A multi-speed transmission module is provided that can passively and automatically upshift and downshift between two speed ratios, even if the speed of the output member does not decrease. The transmission module includes a planetary gear set having a first member, a second member, and a third member. The members include a sun gear member, a carrier member, and a ring gear member, and may be considered first to third, third to first, etc. in any order. The input member is operatively connected for common rotation with the first member and the output member is operatively connected for common rotation with the second member. A torque-transmitting mechanism is engageable to connect the first member for common rotation with the second member. A centripetal member is configured to apply a first axial force urging engagement of the torque-transmitting mechanism. The first axial force increases as the speed of the output member increases. A torque-to-thrust actuator, such as a ball screw actuator, is connected for rotation with the input member and is configured to apply a second axial force opposing engagement of the torque-transmitting mechanism. The torque-to-thrust actuator moves axially as torque is applied to the input member to produce the second axial force. The second axial force is proportional to torque at the input member and is applied whether the torque-transmitting mechanism is engaged or disengaged.

The transmission module thereby provides a first speed ratio between the input member and the output member that is determined by the planetary gear set when the sum of the second axial force and the return force of a spring acting against the centripetal member is greater than the first axial force (because the torque-transmitting mechanism is disengaged), and provides a second speed ratio when the first axial force is greater than the sum of the second axial force and the return spring force (because the torque-transmitting mechanism is passively engaged). The second speed ratio may be a direct drive speed ratio. Because the second axial force is present even when the torque-transmitting mechanism is engaged, the module can also passively and automatically "downshift" from the second speed ratio to the first speed ratio even at a constant output speed such as in response to an increase in torque at the input member. As used herein, a shift is passive and automatic when it occurs without electronic or hydraulic control.

The above features and advantages and other features and advantages of the present invention are readily apparent from the following detailed description of the best modes for carrying out the invention when taken in connection with the accompanying drawings.

DETAILED DESCRIPTION

Figure 1:
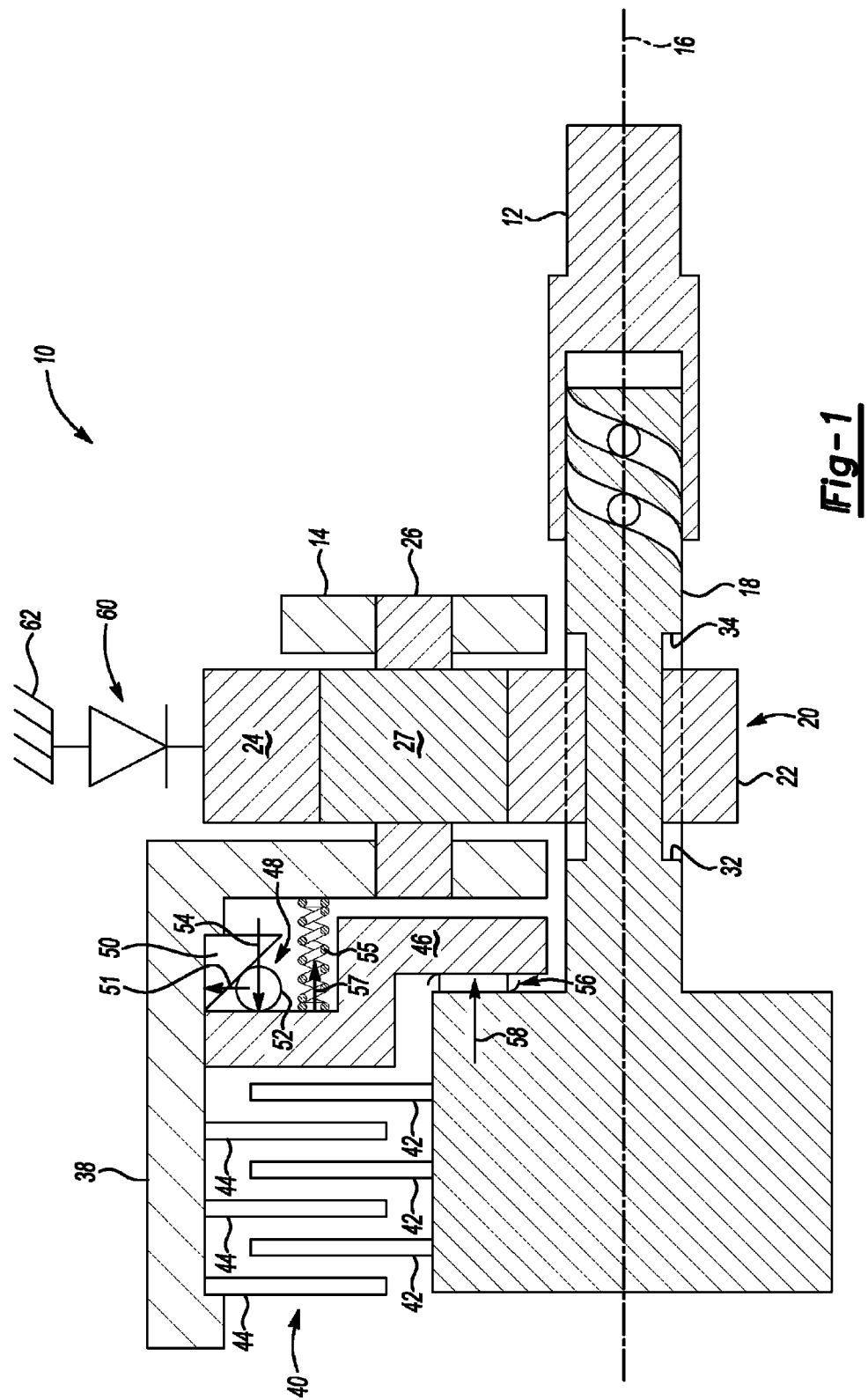
FIG. 1 is a schematic cross-sectional illustration of a first embodiment of a transmission module.

Referring the drawings, wherein like reference numbers refer to like components throughout the views, FIG. 1 shows a transmission module 10 that is configured to transmit torque between a rotatable input member 12 and a rotatable output member 14 at two different speed ratios, and to passively and automatically shift between the speed ratios. The input member 12 is rotatable about an axis of rotation 16. A torque-to-thrust actuator, which in this embodiment is a ball screw 18, is operatively connected for common rotation with the input member 12 and moves axially in proportion to the torque applied to the input member 12, as described further herein. As used herein "common rotation" means rotation at the same speed. Although a ball screw 18 is shown, any torque-to-thrust actuator may be used.

The transmission module 10 includes a planetary gear set 20. The planetary gear set 20 has a sun gear member 22, a ring gear member 24, and a carrier member 26 that rotatably supports a plurality of pinion gears 27 that mesh with both the sun gear member 22 and the ring gear member 24. The sun gear member 22 is referred to as the first member and the carrier member 26 is referred to as the second member. The sun gear member 22 is splined to the ball screw 18 so that it rotates with the ball screw 18 and the input member 12, but allows the ball screw 18 to move axially through the center of the sun gear member 22. Axial movement of the ball screw 18 is limited to a distance between either shoulder 32, 34 of the ball screw 18 and the axially stationary sun gear member 22. The axial travel of the ball screw 18 is ultimately determined by the magnitude of torque at the input member 12 and centripetal force acting on a centripetal member 48.

The output member 14 is connected for common rotation with the carrier member 26. A hub 38 is also connected for common rotation with the carrier member 26, and thus rotates at the same speed as the output member 14. A torque-transmitting mechanism, also referred to as a clutch 40, includes a first set of plates 42 splined to the ball screw 18 to rotate with the ball screw 18. A second set of plates 44 are interleaved with the first set of plates 42 and are splined to the hub 38 to rotate with the hub 38. An apply piston 46 is connected for rotation with the hub 38, but is axially movable along the hub 38 to move the first set of plates 42 into contact with the second set of plates 44, engaging the clutch 40 and causing the hub 38 and the ball screw 18 to rotate at the same speed. Although only a portion of the plates 42, 44, the hub 38 and the piston 46 above the axis of rotation 16 are shown, these components are all generally annular.

Figure 2:
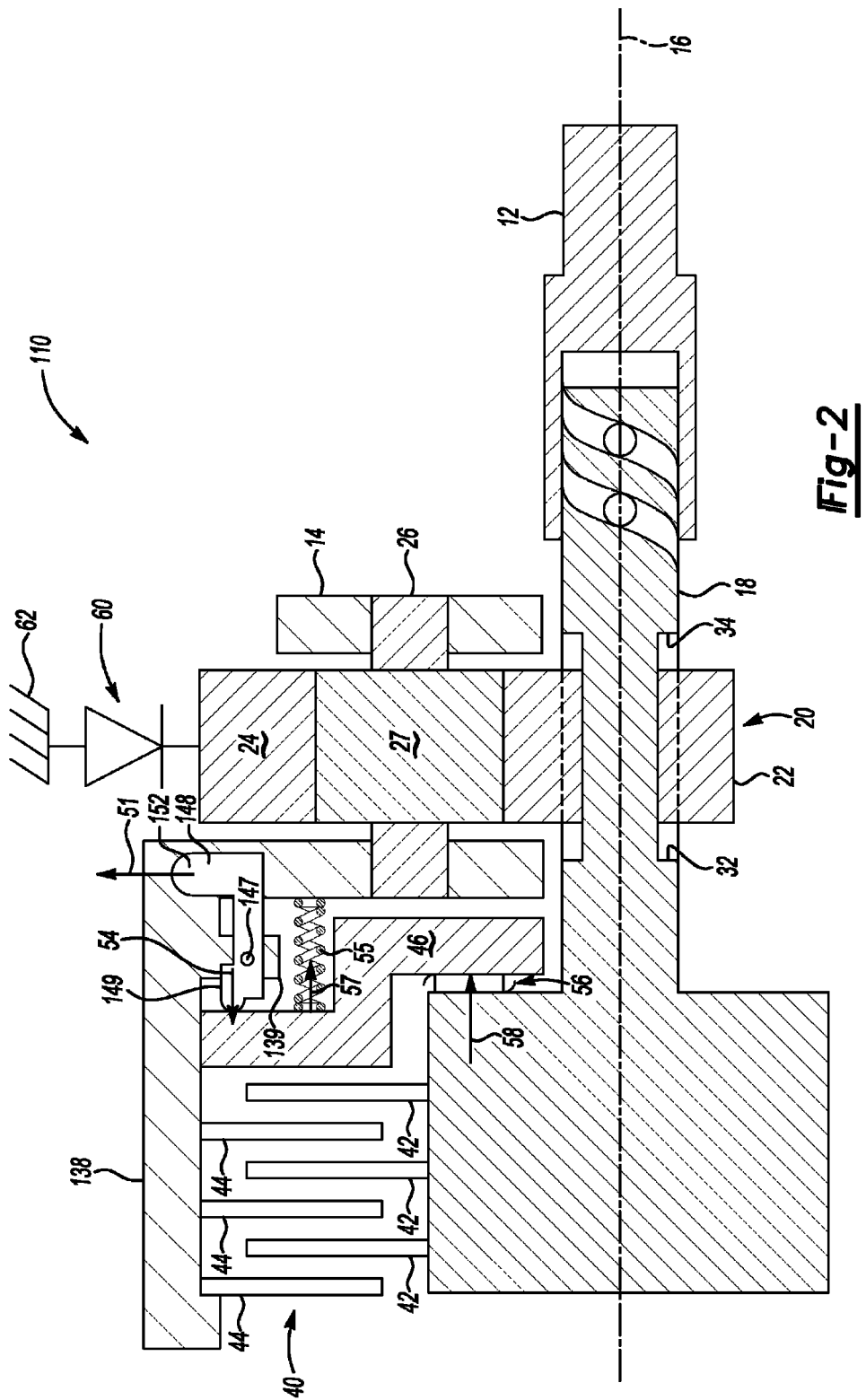
FIG. 2 is a schematic cross-sectional illustration of a second embodiment of a transmission module.

A centripetal member 48 is operable to move the apply piston 46 axially to the left in FIG. 1 to urge the plates 42, 44 into engagement with one another. Although only one centripetal member 48 is shown, multiple centripetal members 48 may be spaced about the circumference of the piston 46. Specifically, the centripetal member 48 is a ball and ramp-type centripetal member in the embodiment shown. Other types of centripetal members may be used instead, such as a ramp with a roller, a wedge, a block, or a pivoting weighted mass as shown in FIG. 2. The centripetal member 48 includes a ramp 50 connected for rotation with the hub 38. A weighted ball 52 is positioned between the piston 46 and the ramp 50. As the output member 14 rotates, centripetal force 51 acts on the ball 52 in a radially-outwards direction, creating an axial apply force 54 that acts on the piston 46 as the ball 52 is urged radially-outwards along the ramp 50. The axial apply force 54 is referred to herein as a first axial force and urges the apply piston 46 toward the plates 42, 44. A return spring 55 applies an axial force 57 in an opposing direction against the apply piston 46 to urge the piston 46 to the position in FIG. 1 in which the plates 42, 44 are not in contact with one another so that the clutch 40 is disengaged. The return spring 55 applies axial force 57 when in tension. Alternatively, a return spring may be positioned on the opposing side of the piston 46 to apply the axial force 57 when in compression.

A roller bearing 56 separates the apply piston 46 and the ball screw 18. The ball screw 18 is urged to move axially in an opposite direction than the apply force 54 in response to torque applied at the input member 12. The ball screw 18 thus applies a release force 58 that opposes force 54, and may be referred to as a thrust release force as it opposes engagement of the clutch 40.

If the axial force 54 overcomes counteracting forces, specifically the release force 58 and the return force 57, then the apply piston 46 will move toward the plates 44 also moving the ball screw 18 and the plates 42 in the same axial direction (to the left in the drawing). The axial apply force 54 increases in magnitude as the speed of rotation of the output member 14, and thus the centripetal force 51, increases.

A freewheeler 60 is connected between the ring gear member 24 and a stationary member 62. The freewheeler 60 may also be referred to as a one-way brake. When torque is applied in one direction, such as when clutch 40 is disengaged, the freewheeler 60 provides a reaction force by locking the ring gear member 24 to the stationary member 62. When torque is applied to the ring gear member 24 in the opposing direction, such as when clutch 40 is engaged, the freewheeler 60 overruns, which is referred to as "lifting" as sprags or other wedging elements in the freewheeler 60 do not provide reaction force to brake the ring gear member 24 in the freewheeling direction. Like the centripetal member 48, the freewheeler 60 locks and lifts passively and automatically in response to the torque applied at the ring gear member 24. Any type of passively-engageable, one-way brake may be used as the freewheeler 60.

Under relatively high torque at the input member 12 and/or relatively low speed of the output member 14, the combined axial release force 58 and return spring force 57 are greater than the axial apply force 54. The clutch 40 is thus in a disengaged state. The speed of the output member 14 is thus determined by the gear ratio of the planetary gear set 20, as torque flows from the sun gear member 22 to the carrier member 26 with the ring gear member 24 held stationary. The speed ratio from the input member 12 to the output member 14 when the clutch 40 is disengaged may be an underdrive speed ratio.

Under relatively low torque at the input member 12 and/or relatively high speed of the output member 14, the centripetal apply force 54 will be greater than the sum of the release force 58 and the return spring force 57. The clutch 40 will thus be in an engaged state. The carrier member 26 and output member 14 will rotate at the same speed as the sun gear member 22 and the input member 12. When two members of the planetary gear set 20 rotate at the same speed, the entire gear set 20 becomes locked for rotation at a common speed. Thus, when the clutch 40 is engaged, the ring gear member 24 also rotates at the same speed as the sun gear member 22 and carrier member 26, with the freewheeler 60 lifting. When the clutch 40 is engaged, the transmission module 10 provides a direct drive ratio between the input member 12 and the output member 14.

When the transmission module 10 is operating in direct drive with the clutch 40 engaged, if the speed of the output member 14 is slowed, such as due to engine braking, or if torque applied to the input member 12 is increased, even if the speed of the output member 14 is constant and is at a relatively high speed, the module 10 will automatically and passively disengage the clutch 40, and the transmission module 10 will downshift to the first speed ratio provided by the planetary gear set 20. The downshift is possible because the axial release force 58 provided by the ball screw 18 is present regardless of whether the clutch 40 is engaged or disengaged (i.e., the axial release force 58 is present even when the clutch 40 is engaged).

In another embodiment, the gear set 20 may be replaced by a helical gear set that provides axial thrust as a clutch release force when the gear set is carrying torque. When the clutch 40 is engaged, the components of the helical gear set would not be carrying torque and would not provide a release force. However, the release force 54 would still be present.

Referring to FIG. 2, another embodiment of a transmission module 110 is shown. Module 110 is alike in all aspects and functions as module 10 of FIG. 1, except that a centripetal member 148 that is a pivoting weighted mass is used instead of the ball-and-ramp type centripetal member 48 of FIG. 1. Furthermore, hub 138 is modified in comparison to hub 38 to include an inwards extension 139 to support the centripetal member 148. The centripetal member 148 is pivotally connected for rotation with the output member 14 at pivot 147 with a pivot pin or other suitable fastener. Although only one centripetal member 148 is shown, multiple centripetal members 148 could be circumferentially spaced about the apply member 46 and hub 138. The centripetal member 148 is configured with a mass 152. When the output member 14 rotates about the axis of rotation 16, centripetal force 51 moves the mass 152 radially outwards so that the centripetal member 148 pivots counter clockwise from the position shown in FIG. 2. This causes an arm portion 149 of the second centripetal member 148 to apply an axial force 54 in an axial direction against piston 46 to urge the piston 46 toward the plates 42, 44. The axial force 54 increases as the rotational speed of the output member 14 increases, and thus the centripetal force 51 increases.

Thus, the transmission modules 10, 110 passively and automatically provide shifts between two different speed ratios. If additional speed ratios are desirable, additional similar transmission modules may be attached with an input member at the output member 14 of modules 10, 110. The structure of the additional module (e.g., the structure of any or all of the centripetal members, the return spring, the gear set and the ball screw) may be modified so that the speed ratios of the additional module are established, also passively and automatically, at different torques and output speeds.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission module comprising:
   an input member;
   an output member;
   a planetary gear set having a first member, a second member, and a third member; wherein the input member is operatively connected for common rotation with the first member and the output member is operatively connected for common rotation with the second member;
   a torque-transmitting mechanism engageable to connect the first member for common rotation with the second member;
   a centripetal member configured to apply a first axial force urging engagement of the torque-transmitting mechanism, the first axial force increasing as the speed of the output member increases;
   an actuator connected for rotation with the input member and operable to move axially when torque is applied at the input member; wherein the actuator is configured to apply a second axial force opposing engagement of the torque-transmitting mechanism; and wherein the second axial force is proportional to torque at the input member and is applied whether the torque-transmitting mechanism is engaged or disengaged;
   the transmission module thereby providing a first speed ratio between the input member and the output member determined by the planetary gear set when the torque-transmitting mechanism is disengaged and providing a direct drive speed ratio when the torque-transmitting mechanism is engaged.

2. The multi-speed transmission module of claim 1, wherein the centripetal member includes a ramp connected for rotation with the output member and a ball movable along the ramp.

3. The multi-speed transmission module of claim 1, wherein the centripetal member is a weighted mass pivotally connected for rotation with the output member.

4. The multi-speed transmission module of claim 1, further comprising:
   a one-way brake configured to engage when torque is applied to the third member in a first direction and to overrun when torque is applied to the third member in a second direction opposing the first direction.

5. The multi-speed transmission module of claim 1, wherein the first member is a sun gear member splined for rotation with the actuator.

6. The transmission module of claim 1, further comprising:
   an apply piston connected for rotation with the output member and axially moveable with respect to the output member; wherein the first axial force and the second axial force are applied to the apply piston.

7. The multi-speed transmission module of claim 6, further comprising:
   a roller bearing positioned between the apply piston and the actuator.

8. A multi-speed transmission module comprising:
   an input member;
   an output member;
   a ball screw connected for common rotation with the input member and operable to move axially in response to torque at the input member;
   a planetary gear set having a first member, a second member, and a third member; wherein the first member is connected for rotation with the ball screw and is fixed axially so that the ball screw moves axially relative to the first member;
   wherein the second member is connected for common rotation with the output member;
   an apply piston connected for rotation with the output member and slidable axially relative to the output member;
   a first set of friction plates extending from the ball screw and a second set of friction plates extending from the output member;
   a centripetal member positioned to apply a first axial force to the apply piston to engage the first and second sets of friction plates as the speed of the output member increases; wherein the axial movement of the ball screw applies a second axial force to the apply piston opposing the first axial force and proportional to torque at the input member; wherein a first speed ratio between the input member and the output member is established when the torque-transmitting mechanism is not engaged and a second speed ratio between the input member and the output member is established when the torque-transmitting mechanism is engaged; and
   a one-way follower operatively connected to the third member and operable to prevent rotation of the third member when the third member applies a torque in a first direction of rotation when the plates are not engaged and operable to overrun when the plates are engaged, an upshift and a downshift between the speed ratios occurring passively and automatically in response to centripetal force caused by rotation of the output member and torque at the input member.

9. The multi-speed transmission module of claim 8, wherein the centripetal member includes a ramp connected for rotation with the output member and a ball movable along the ramp.

10. The multi-speed transmission module of claim 8, wherein the centripetal member is a weighted mass pivotally connected for rotation with the output member.

11. The multi-speed transmission module of claim 8, wherein the first member is a sun gear member splined for rotation with the actuator.

12. The transmission module of claim 8, further comprising:
   a roller bearing positioned between the apply piston and the ball screw.

13. A multi-speed transmission module comprising:
an input member;
an output member;
a planetary gear set having a sun gear member, a carrier member, and a ring gear member; wherein the output member is operatively connected for common rotation with the carrier member;
a torque-transmitting mechanism engageable to connect the sun gear member for common rotation with the carrier member;
a centripetal member configured to apply a first axial force urging engagement of the torque-transmitting mechanism, the first axial force increasing as the speed of the output member increases;
a spring configured to apply a spring force opposing the first axial force and urging disengagement of the torque-transmitting mechanism;
an actuator connected for rotation with the input member and operable to move axially when torque is applied at the input member; wherein the sun gear member is splined to the actuator to rotate at the same speed as the actuator and the input member; wherein the actuator is configured to apply a second axial force opposing engagement of the torque-transmitting mechanism; wherein the second axial force is proportional to torque at the input member and is applied whether the torque-transmitting mechanism is engaged or disengaged; and
a one-way brake configured to engage when torque is applied to the ring gear member in a first direction and to overrun when torque is applied to the ring gear member in a second direction opposing the first direction;
the transmission module thereby providing a first speed ratio between the input member and the output member determined by the planetary gear set when the torque-transmitting mechanism is disengaged and providing a direct drive speed ratio when the torque-transmitting mechanism is engaged.

* * * * *